Oct. 31, 1950     L. G. SIMJIAN     2,527,584
PHOTOGRAPHIC PLATE MOVING APPARATUS
Filed Feb. 2, 1946     6 Sheets-Sheet 1

INVENTOR.
L. G. Simjian
BY
A. H. Golden
Attorney

Oct. 31, 1950 — L. G. SIMJIAN — 2,527,584
PHOTOGRAPHIC PLATE MOVING APPARATUS
Filed Feb. 2, 1946 — 6 Sheets-Sheet 2

INVENTOR
L. G. Simjian
BY
A. H. Golden
ATTORNEY

Oct. 31, 1950 L. G. SIMJIAN 2,527,584
PHOTOGRAPHIC PLATE MOVING APPARATUS
Filed Feb. 2, 1946 6 Sheets-Sheet 3

Fig. 8.

INVENTOR
L. G. Simjian
BY
A. H. Golden
ATTORNEY

Oct. 31, 1950 L. G. SIMJIAN 2,527,584
PHOTOGRAPHIC PLATE MOVING APPARATUS
Filed Feb. 2, 1946 6 Sheets-Sheet 4

Fig. 9.

INVENTOR.
L. G. Simjian
BY
A. H. Golden
Attorney

Oct. 31, 1950      L. G. SIMJIAN      2,527,584
PHOTOGRAPHIC PLATE MOVING APPARATUS Filed Feb. 2, 1946      6 Sheets—Sheet 6

INVENTOR
L. G. Simjian
BY A. H. Golden
ATTORNEY

Patented Oct. 31, 1950

2,527,584

UNITED STATES PATENT OFFICE 2,527,584

PHOTOGRAPHIC PLATE MOVING APPARATUS

Luther G. Simjian, Riverside, Conn.

Application February 2, 1946, Serial No. 645,047

3 Claims. (Cl. 95—37)

This invention relates to a combination of the class disclosed in my Patent 2,386,276, granted October 9, 1945, wherein I show and claim a camera that is linearly movable on a base for photographing on one plate several views of an object.

In the camera of my earlier patent, a movable photographic plate is utilized, the plate being mounted in a plate holder that is adapted to move into several different positions relatively to the lens of the camera. It is a feature of the said camera that the plate holder is moved into its several positions coincidental with the movement of the camera on a mounting base. It is an object of this invention to contribute a camera of the type disclosed in my said patent, but embodying structure whereby better photographs may be taken with a minimum of skill.

One of the features of my invention whereby the objects thereof are obtained, resides in the utilization of focusing mechanism that is automatically adjusted as the camera is moved transversely relatively to the mounting base and therefore toward and from the object being photographed. Thus, the mere movement of the camera relatively to the object for varying the size of the image is effective to adjust the focus automatically. As a more particular feature of this part of the invention, the focusing mechanism is so constructed that once it is focused in any particular position of the camera, it automatically remains focused in all positions of the camera on the mounting base.

A further feature of the invention resides in the utilization of a mounting member on which the camera is mounted for transverse movement, the mounting member itself moving linearly on a base into the several positions in which the camera is adapted to take photographs. Means are provided on the mounting member for moving the camera transversely relatively thereto, and therefore transversely of the base. Means are provided on the mounting member for moving the plate holder of the camera into its several positions, and it is a feature of the invention that the means on the mounting member are in effective engagement with the plate holder actuating mechanism in all positions of the camera relatively to the mounting member.

As a still further feature of the invention the mounting member and camera are adapted for movement relatively to the base by means of novel character. Thus, as a feature of the invention the base is provided with a roller or similar type chain, and the mounting member is provided with a sprocket adapted for contact with said chain. Rotation of the sprocket moves the camera and mounting member linearly relatively to the base. As still a further feature of this part of the invention, the chain is adapted through its coaction with the sprocket to guide the mounting member in its movement relatively to the base so that if the chain is arranged in an arcuate path, the camera and mounting member will be moved in an arcuate path.

A further feature of the invention resides in the mounting of the camera so that it may be tilted. More particularly, this feature of the invention resides in means mounting the camera, preferably through the mounting member and base, for tilting movement through movement of the camera bodily in an arcuate path centered on the lens of the camera when the camera is in a particular position. More particularly, this feature of the invention resides in the mounting of the camera so that it moves with the base member relatively to a foundation in the particular manner set forth.

In the camera of my earlier patent, the plate holder is moved by means of a pinion in contact with a series of racks arranged preferably at right angles to one another. The rotation of the pinion moves the plate holder equally in all directions to which movement is imparted thereto, this being desirable because each of the pictures that results is square. In the present invention, it is desirable that the photographs be oblong in form, and therefore it is necessary to impart greater movement to the film holder in one direction than in a direction at right angles to the said one direction. As a feature of the invention I contribute means for imparting such movement to the plate holder.

More particularly, this feature of the invention resides in the utilization of movement imparting means on the plate holder that are adapted for different cooperation with actuating means provided for the purpose. More particularly, this feature of my invention resides in the utilization of offset racks adapted for coaction with different pinions, it being still a further feature of the invention that the said different pinions are on one shaft and are rotated coincidentally with the movement of the camera and its mounting member linearly on the base. Even more particularly, the pinions are formed with varying numbers of teeth so that each pinion will impart a different speed of movement to the racks. It is of course quite apparent that the racks may have teeth of different formation for contributing the same result.

A further feature of the invention resides in means for controlling the actuation of the shutter of the camera. Thus, a particular feature of the invention resides in means whereby once the shutter is actuated to take a photograph, it can not be actuated once again until the camera is moved linearly on the base to present a further portion of the film to the lens. In this way, double exposure of the film is prevented, and the camera is rendered fool-proof when operated by unskilled or careless operators. As still a further feature of this portion of the invention, the actuation of the shutter is prevented after the final exposure, until the plate holder is manipulated in a predetermined manner. Preferably, this manipulation comprises the movement of the cover of the film holder for the withdrawal of the film plate therefrom. Those skilled in the art will readily appreciate that in this manner the double exposure of the film after the taking of the last photograph, is prevented.

A still further feature of the invention resides in means utilizing for the counter-balancing of the plate holder so as to facilitate its movement vertically on the camera.

Still a further feature of the invention resides in the utilization of means for exposing a part of each film portion to light reflected from a numbering or other identifying means. A further feature of this portion of the invention resides in the utilization of an auxiliary shutter that is manipulated simultaneously with the main shutter for passing light from a numbering or other identifying member to a small part of each film portion. As a still further feature of this part of the invention, I utilize novel means for holding a numbering or similar identifying plate in position for the reflection of a portion of its image to each film portion exposed to the main shutter.

I have thus outlined the more important features of my invention in order that my contribution to the art may be better understood and in order that the relation of my contribution to the prior art may be better comprehended. I do believe that my contribution is a broad and valuable one and that I am therefore entitled to patent claims that will prevent newcomers in the field from utilizing my invention with such variations in physical structure as will readily occur to those skilled in the art. Also, while I have described generally several important features of my invention, there are other important features that will be described particularly in the specification and will be claimed in the claims appended hereto.

Referring now to the drawings.

Referring now more particularly to the drawings, and especially Figs. 1-4 inclusive, my camera is designated generally by reference numeral 10 and is mounted for transverse movement toward and from the object on what I term a mounting member 11. This mounting member 11 is in turn mounted for linear movement in an arcuate path on what I term a base 12. The base 12 is in turn adapted for pivotal movement together with the mounting member 11 and camera 10 relatively to what I term a foundation 13.

Figures 5, 6, 7:
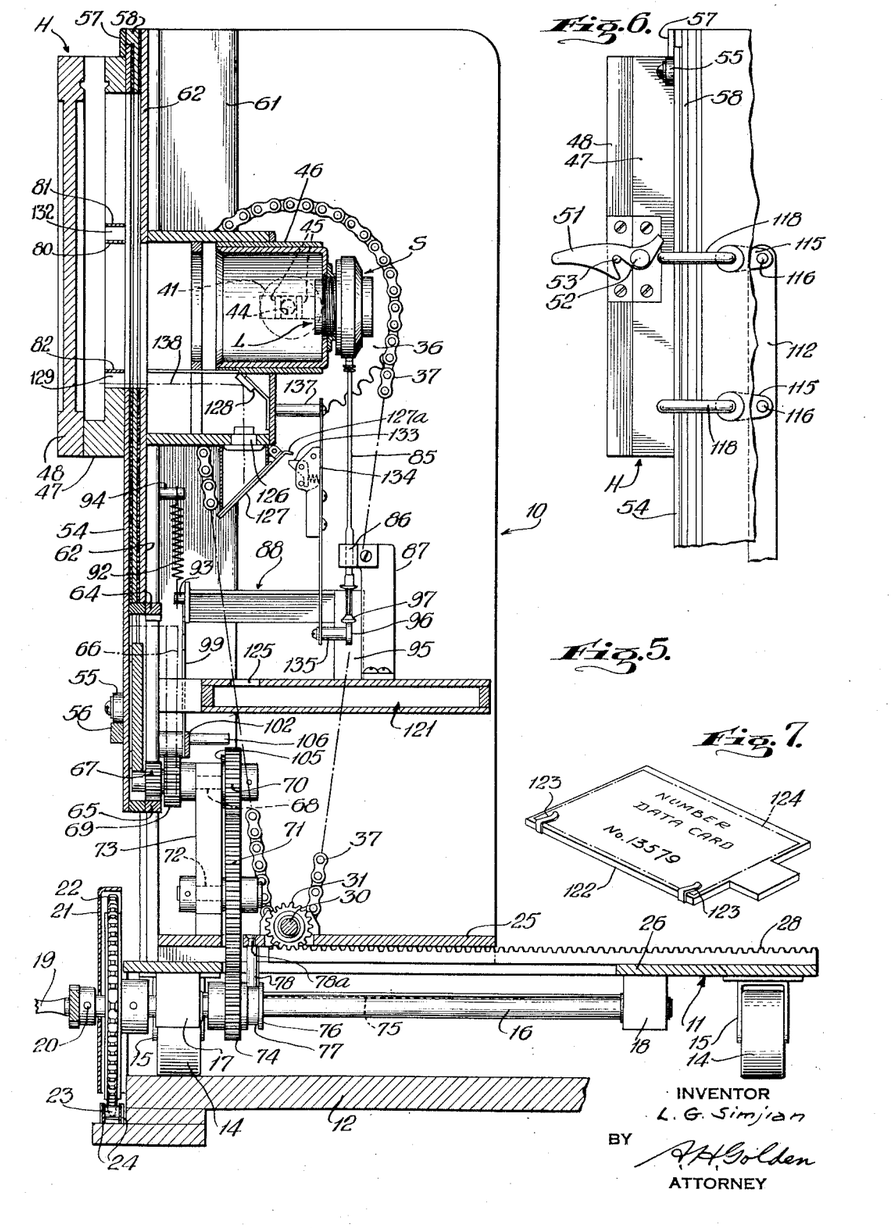
Fig. 5 is a vertical section taken along lines 5—5 of Fig. 1.
Fig. 6 is a detail view showing a latch for the cover of the plate holder and the means actuated by the said latch when it is moved to release position.
Fig. 7 is a view of a holder for the number and data card.
Figure 8:
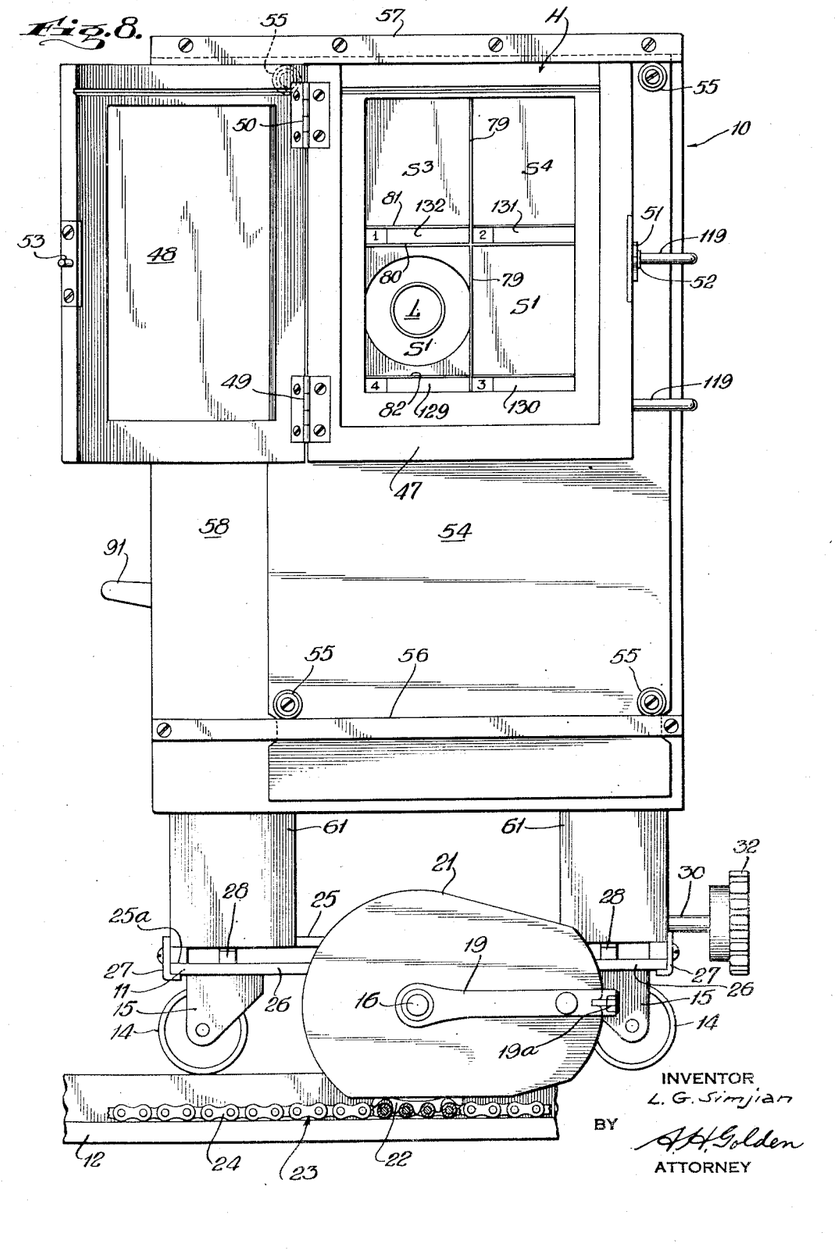
Fig. 8 is a view of the camera and a portion of the mounting member taken generally along lines 8—8 of Fig. 1.

I shall first describe the means whereby the mounting member 11 is movable with the camera 10 linearly on the base 12. As is best seen in such figures as 1, 2, 5, 8 and 9, the mounting member 11 is supported for rolling movement on the base 12 by a series of wheels 14 suitably mounted on brackets 15. Mounted centrally of the mounting member 11, as is best seen in Figs. 5 and 8, is a shaft 16 supported in bearings 17 and 18 fixed on the mounting member. This shaft 16 is rotatable by a crank 19 that is pinned to the shaft at 20, the shaft extending outwardly of the mounting member from a guard casing 21. Within the guard casing 21 there is a sprocket 22 that is suitably secured to the shaft 16 for rotation integrally therewith. The teeth of the sprocket 22 are adapted for engagement with a roller chain 23, this roller chain being applied and fixed to the base 12 as is best seen in Fig. 1.

Figure 1:
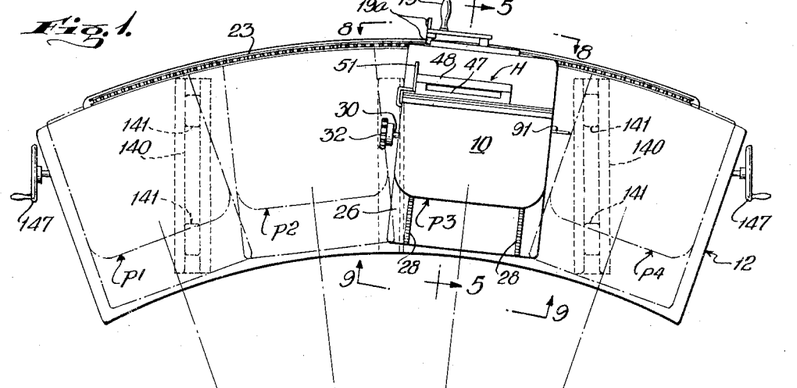
Fig. 1 is a plan view looking downwardly on the camera of my invention mounted on a mounting member and in turn on a base member, with a base member movable on a foundation.
Figure 2:
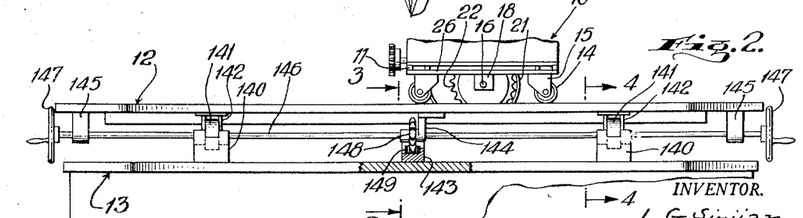
Fig. 2 is a view in elevation of part of the structure shown in Fig. 1.
Figure 3:
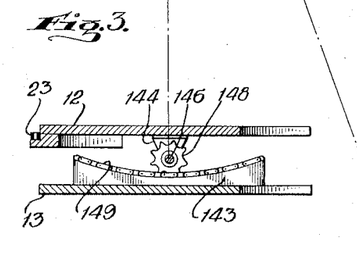
Figs. 3 and 4 are sections taken respectively along lines 3—3 and 4—4 of Fig. 2.
Figure 4:
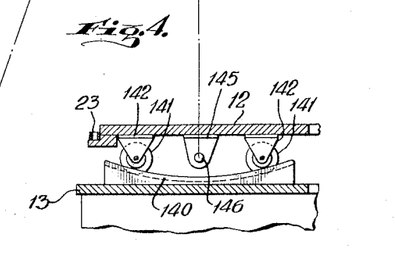

Since it is desirable that the camera move in the path of an arc centered at the point C in Fig. 1, the base 12 is shaped so as to allow the camera to so move. The chain 23 is applied to the base in an arcuate path, being sufficiently flexible for this purpose, and it is the function of the sprocket when it is rotated by the crank 19 and shaft 16 to coact with the chain and move the camera linearly in the arcuate path of the chain 23. Moreover, the sprocket 22 is adapted for coaction with the plates 24 of the roller chain 23 so as to maintain the camera in the path predetermined by the positioning of the roller chain. Thus, the sprocket 22 and the chain 23 coact not only to move the camera but also to guide the camera in accordance with the path predetermined by the positioning of the chain on the base 12.

Figure 9:
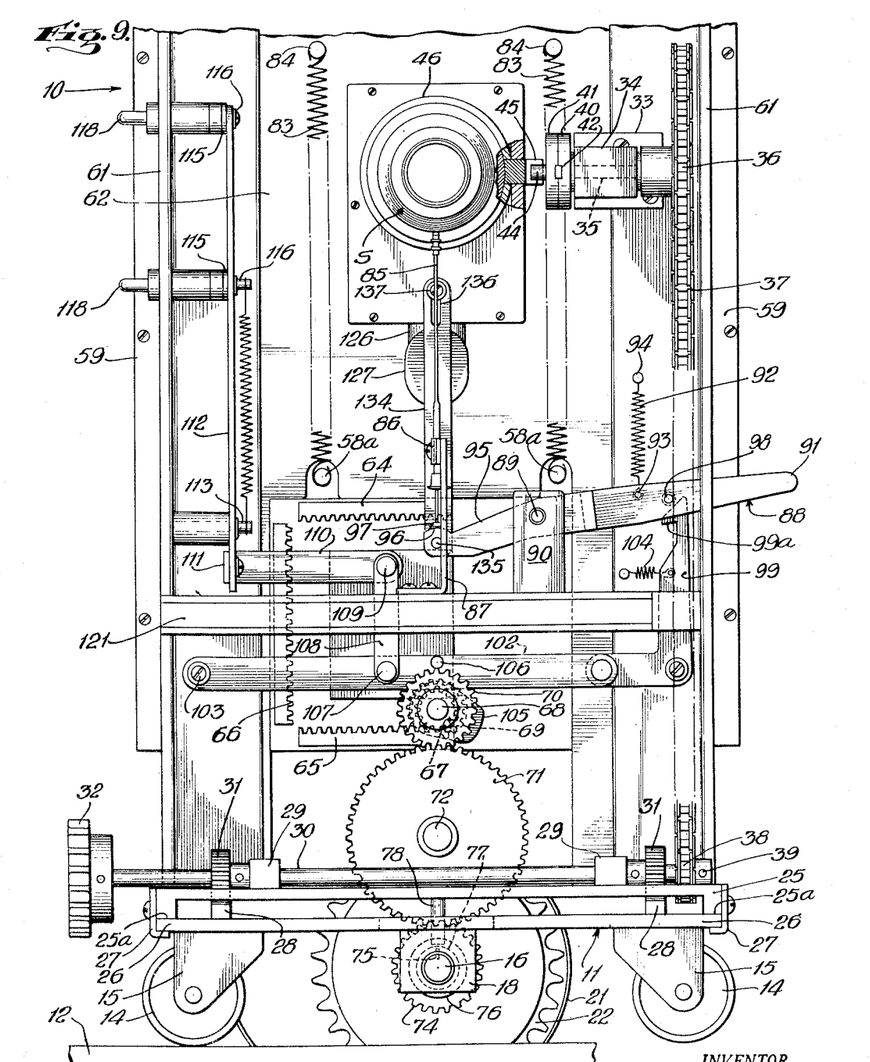
Fig. 9 is a view of a portion of the camera taken along the line 9—9 of Fig. 1.

I shall now describe the manner in which the camera 10 is movable transversely to the mounting member 11 to and from the point at C. For the particular purpose, the lower portion of camera 10 is formed from one or more channel members 25 as best shown in Fig. 9. These channel members have surfaces 25a adapted to bear on a plate 26 of the mounting member 11 so that the camera may slide transversely relatively to the mounting member 11. For retaining the camera on the plate 26 for this movement, the channel members 25 have secured thereto brackets 27 which cooperate with the side edges and under surfaces of the plate 26 for the particular purpose, all as those skilled in the art will readily appreciate. Naturally, it is possible to devise any number of means for mounting the camera for sliding movement relatively to the mounting member 11 and I have herein described but one particular form.

Fixed to the plate 26 of the mounting member 11 are a pair of parallel racks 28 as best seen in Figs. 5 and 9. Mounted on the camera itself through bearings 29 fixed to one of the channels 25 is a shaft 30. This shaft 30 carries thereon two pinions 31 that are in engagement with the racks 28. Secured to the shaft 30 outwardly of the camera is a knob 32, and it is now obvious that mere rotation of the knob 32 and the shaft 30 will cause a reaction between the pinions 31 and racks 28 for moving the camera relatively to the mounting member and toward and away from the point C at which is stationed the object to be photographed.

Figure 10:
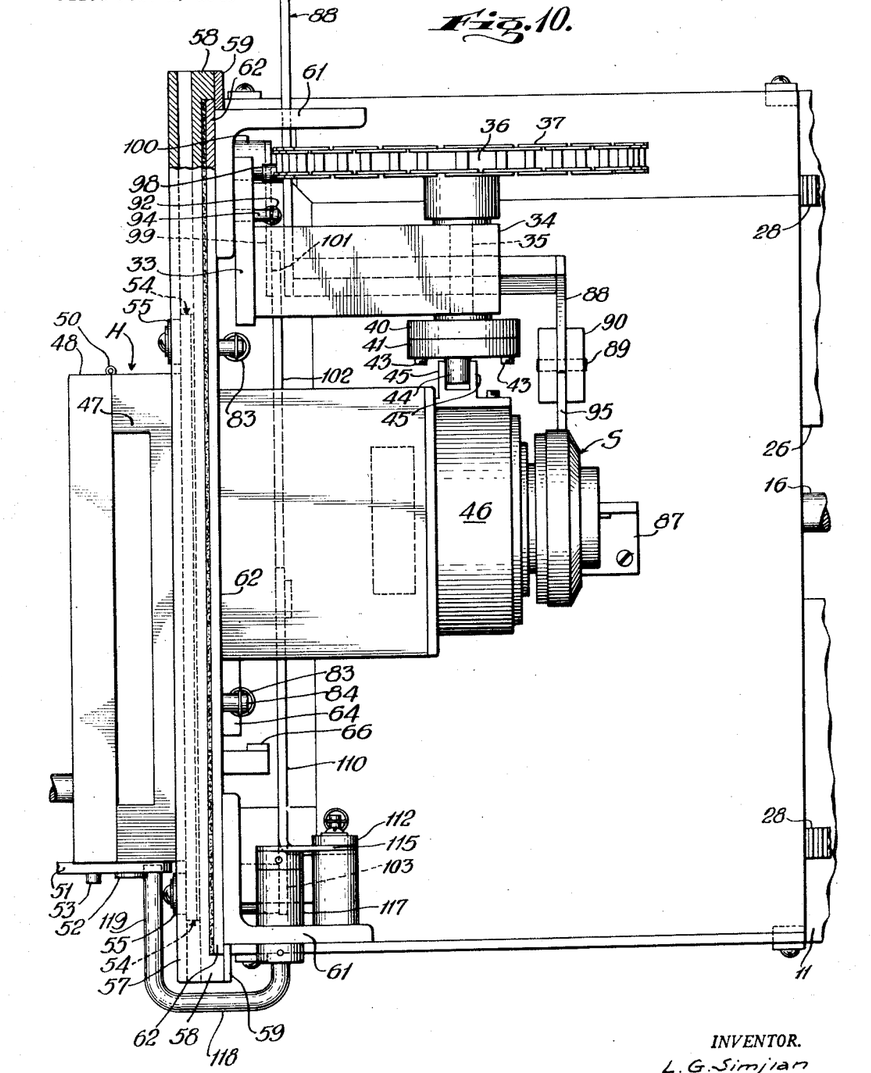
Fig. 10 is an enlarged view looking downwardly on the camera.

As was earlier set forth generally, it is desirable that the transverse movement of the camera on the mounting member 11 be effective to adjust automatically the focusing mechanism of the camera so that the camera, once focused, will remain in focus in all positions thereof. For the particular purpose, the camera frame carries thereon a bracket 33 formed with a bearing abutment 34 as is best seen in Figs. 9 and 10. Mounted within the bearing abutment 34 is a shaft 35 to which is suitably secured a sprocket wheel 36. Running over the sprocket wheel 36 is a sprocket chain 37, which as best illustrated in Fig. 5 extends downwardly from the sprocket 36 into coaction with a sprocket 38 best illustrated in Fig. 9. This sprocket 38 is pinned at 39 to the shaft 30, it being remembered that this is the shaft that contributes the transverse movement of the camera relatively to the mounting member 11 and the base 12.

The shaft 35 that is rotated by the sprocket 36 carries a disc 40 that is secured for integral rotation therewith as best seen in Figs. 9 and 10. A second disc 41 is mounted for sliding movement relatively to the disc 40 on a key 42 and may be secured to the disc 40 in any one of a series of positions by means such as screws 43 shown in Fig. 10. A pin 44 extends from the disc 41 and it is obvious that this pin 44 may be moved into any predetermined eccentric position relatively to the shaft 35 through the sliding adjustment of the disc 41 on key 42 relatively to the disc 40. Pin 44 is adapted to lie between the lugs 45 secured to the camera focusing tube 46 and to move that tube inwardly and outwardly relatively to the camera so as to change the focus in a manner which will be readily understood by those skilled in the art.

In actual operation, the camera will first be focused in a particular position and the pin 44 will then be applied between the lugs 45. The eccentricity of the pin 44 will then be adjusted by movement of the disc 41 relatively to key 42 and disc 40 so that its movement by the rotation of the shaft 35 incidental to the movement of the camera toward and away from point C will always maintain the camera in focus. In other words, once the camera is focused, it will be maintained in focus by the rotation of pin 44 incidental to the transverse movement of the camera toward and from the object.

The plate holder of my camera is designated generally by reference letter H and comprises the usual base 47 and a cover 48, the cover being hinged to the base at 49 and 50 as is best seen in Fig. 8. A latch 51 is pivoted at 52 to the base 47 and coacts with a pin 53 on the cover for maintaining the cover in its closed position of Fig. 6.

It will of course be readily appreciated that a usual type of plate film may be inserted into the plate holder H for exposure through the lens L upon actuation of the shutter mechanism.

The plate holder H is secured to a metal bearing plate 54 as probably best seen in Figs. 5, 8 and 10. The bearing plate 54 is formed with four bearing rollers 55 best seen in Fig. 8, the lower rollers resting on a bar 56 while the upper rollers 55 rest on a bar 57, it being obvious now that the bearing plate 54 may move horizontally on the rollers relatively to the bars 56 and 57. Bars 56 and 57 are secured to a vertically moving carrying member 58 to which are secured bearing strips 59 as best seen in Fig. 10. These bearing strips 59 bear against structural right angle members 61 that are fixed to form part of the camera frame. A plate 62 is fixed to the angle member 61 and is of course itself therefore part of the main frame of the camera.

It is now obvious that the carrying member 58 is adapted for vertical sliding movement relatively to the plate 62 and right angle members 61, and therefore is really arranged for vertical sliding movement relatively to the camera itself. It is of course further apparent that the bearing plate 54 is adapted for lateral movement relatively to the carrying member 58 while moving vertically therewith. The plate holder H, being fixed to bearing plate 54, will move horizontally relatively to the camera with plate 54 and vertically on the camera with carrying member 58. In summary, the plate holder H is adapted for horizontal and vertical movement relatively to the camera. This movement is imparted thereto by a system of racks and opinions related to that illustrated in my earlier Patent 2,386,276, and now to be described.

Figures 11, 12:
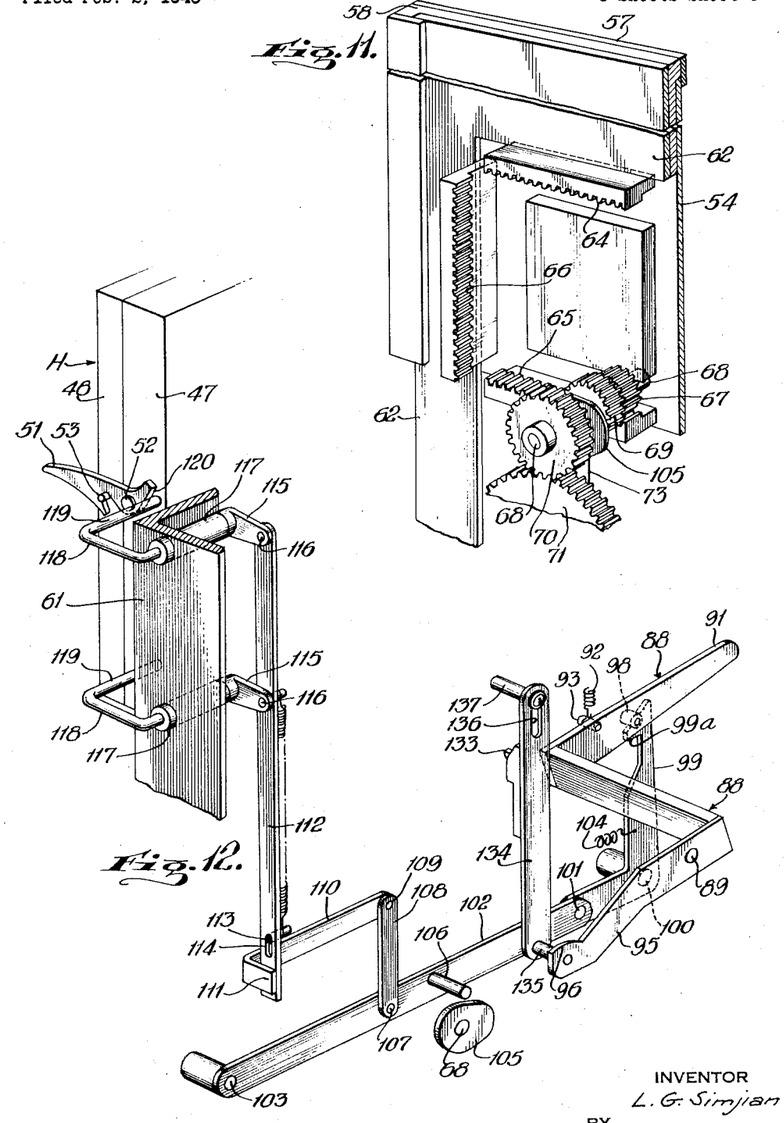
Fig. 11 is a perspective view of the means for moving the film plate holder.
Fig. 12 is a perspective view showing the means for controlling the actuation of the shutter.

Referring now to Figs. 5, 9 and 11, the bearing plate 54 has fixed thereto horizontal racks 64 and 65. There is also secured to the plate 54 a vertical rack 66 the teeth of which are in offset relation to the teeth of racks 64, 65. The racks 64, 65 are adapted for coaction with a pinion 67 secured to a shaft 68, while the teeth of rack 66 are adapted for coaction with a pinion 69 secured to the same shaft 68. Secured also to the shaft 68 is a gear 70 in engagement with a further gear 71 as is best seen in Figs. 5, 9 and 11. As is particularly best seen in Fig. 5, the shaft 68, and the further shaft 72 on which is mounted the gear 71, are both journaled in a bearing bracket 72 that extends upwardly from one of the channel members 25 of the camera frame. Gear 71 is in engagement with a pinion 74 that is keyed relatively to a keyway 75 of the shaft 16 as best seen in Fig. 5 and may therefore slide on the shaft 16 while always adapted for rotation thereby.

A hub 76, integral with the pinion 74, is formed with a groove 77 adapted for coaction with a pin 78 secured to the camera frame at 78a as seen best in Fig. 5. Because of this relationship of the parts, when the camera is moved in Fig. 5 toward the right because of the coaction of the pinions 31 with the racks 28, the pin 78 will move the pinion 74 so as to maintain that pinion always in engagement with the gear 71. In other words, in all positions of the camera 10 relatively to the mounting member 11, the pinion 74 of shaft 16 will be in engagement with the gear 71. Naturally, the pinion 74 will always be in keyed and driven relation to the shaft 16 for rotation with the shaft 16. It is of course obvious now that rotation of the shaft 16 incidental to the movement of the camera and its mounting member relatively to the base 12, will effect rotation of the gears 71 and 70. This will in turn effect rotation of the shaft 68 and the pinions 67 and 69.

Considering the bearing plate 54 in its position of Fig. 11, a counter-clockwise rotation of the shaft 68 will cause pinion 67 to coact with the teeth of rack 65 for moving bearing plate 54 to the right in the said Fig. 11. When the said bearing plate has been moved to the extreme right the pinion 67 will move out of engagement with rack 65 while the teeth of pinion 69 will move into engagement with the teeth of rack 66. Thereafter, continued counter-clockwise rotation of the shaft 68 will effect a downward movement of the rack 66 and the plate 54 so as to bring the teeth of pinion 67 into engagement with the upper rack 64. Of course, the bearing plate 54 will now be movable by pinion 67 to the left. The effect of this action will be to move the plate holder H horizontally and vertically, and if desired, into four different positions to make four different photographs on the single plate film.

Because the pinion 69 has more teeth than the pinion 67, the vertical movement of the bearing plate 54 incidental to a particular predetermined rotation of the shaft 68 will be greater than the horizontal movement thereof. Shaft 68 will preferably rotate through one revolution when the camera moves linearly with its mounting member relatively to the base 12 from one picture taking position to a second picture taking position, the four picture taking positions being designated by the four letters $P^1$, $P^2$, $P^3$, and $P^4$ in Fig. 1. As is well set forth in my earlier patent, the crank 19 may be equipped with detent mechanism 19a whereby to lock the shaft 16 after one revolution has been imparted thereto for moving the camera from one position such as $P^1$ to a second position such as $P^2$. Movement from one photographing position to a second photographing position will move the bearing plate through the rack and pinion mechanism horizontally and vertically so as to move the plate holder H to expose one of its four sections $S^1$, $S^2$, $S^3$, and $S^4$ to the lens L. In Fig. 8 the section $S^2$ is exposed to the lens L so that operation of the shutter mechanism will expose that portion of the film subtended by the dividing surfaces 79, 80, 81 and 82 of plate holder H.

It will be noted that each of the sections $S^1$, $S^2$, $S^3$, and $S^4$, instead of being square as in my earlier patent supra, is oblong so that the resulting pictures will also be oblong. It is through the utilization of the two pinions 67 and 69 and the racks 64, 65 that sufficiently greater vertical movement may be imparted to the plate holder H during linear movement of the camera from one picture taking position to another, and whereby oblong rather than square pictures may be taken.

It will be appreciated that the plate holder H and the bearing plate 54 together with member 58 are relatively heavy. For facilitating the vertical movement of these several parts I utilize a pair of springs 83 secured at their upper ends at 84 to the frame of the camera and at their lower ends to pins 58a extending from the vertically sliding carrying member 58. Those skilled in the art will of course fully appreciate the manner in which the springs 83 coact with the several parts.

The shutter mechanism of my camera is conventional and is indicated generally by the reference letter S. This shutter mechanism is adapted for operation upon upward movement of a rod 85 that is supported for sliding movement in a bearing 86 carried by a bracket 87 as is best seen in Fig. 5. For imparting this upward movement to the rod 85 to actuate the shutter mechanism, I utilize a shutter actuator or lever 88 best illustrated in Figs. 9 and 12. This lever 88 is pivotally mounted at 89 on a bracket 90 of the camera and has a finger piece 91 extending outwardly from the camera for manual depression. A spring 92 secured at 93 to the actuator 88, and at 94 to the main frame of the camera, normally urges the actuator into its position of Fig. 9, the downward movement of the finger piece 91 of actuator 88 being against the resistance of the spring 92 and effective to rotate the said actuator clockwise about its pivotal mounting 89. An arm 95 of the lever 88 is formed with a surface 96 that bears against a button 97 secured to the rod 85. Therefore, upon clockwise rotation of the actuator lever 88 in Fig. 9, the arm 95 will move upwardly causing its surface 96 to impart upward movement to the rod 85 through the button 97. This will effect operation of the shutter mechanism S as will be quite apparent to those skilled in the art.

As was earlier indicated in this specification, the shutter mechanism once actuated, is intended to be rendered inoperative against further actuation until the camera is moved from one picture taking position, such as $P^1$ in Fig. 1, to a second picture taking position such as $P^2$. For this purpose, the actuator lever 88 is formed with a pin 98 with which coacts a detent lever 99 as is best seen in Figs. 9 and 12. The detent lever 99 is pivoted at 100 on the frame of the camera and is further pivoted at 101 to a link 102 that is in turn pivoted at 103 on the main frame of the camera. A spring 104 is secured at one end to the detent 99 and at its other end to the main frame of the camera and tends to urge the detent into the position of Fig. 9. Obviously, upon downward movement of the portion 91 of actuator 88, equivalent to clockwise rotation thereof on pivot shaft 89 on Fig. 9, the pin 98 will be brought under the detent surface 99a of detent 99, and the actuator lever 88 will be prevented from moving back to its position of Figs. 9 and 12, thereby rendering the shutter mechanism inoperative.

The shutter actuator lever 88 may be released from detent 99, and more particularly the detent surface 99a, by a rotation of the said detent 99 clockwise about its bearing 100 against the opposition of spring 104. This movement is imparted to the detent 99 through operation of a cam 105 fixed on the shaft 68. It will be recalled that the shaft 68 carries the two pinions 67 and 69 that impart movement to the plate holder H through the bearing plate 54. It will further be remembered that the shaft 68 is rotated incidental to the movement of the camera and its mounting member 11 relatively to the base 12 from one picture taking position to a second picture taking position. This rotation of shaft 68 from one picture taking position to another is 360 degrees, and a high surface of the cam 105 is adapted to contact a pin 106 on link 102 during each revolution of the shaft 68. This movement of the cam 105 will raise link 102 and through pivot 101 will rotate detent 99 to release the actuator lever 88 so that the actuator lever may move under the influence of its spring 92 back to its position of Fig. 9.

It is therefore appreciated that when the camera is moved from one picture taking position such as $P^1$, after the depression and locking of the actuator lever 88, to a second picture taking position such as P², the said actuator lever 88 is released from the detent 99. Actuator 88 then moves to its position of Fig. 9 and may once again be operated to move the shutter actuating rod 85 so that the shutter mechanism may be operated to take a second picture. Of course, upon the taking of the second picture at P² by the depression of the actuator 88, the detent 99 will once again lock the actuator 88 until the camera is moved to the third picture taking position P³. During this movement to the third picture taking position the cam 105 will once again release the actuator lever 88 from the detent 99.

After the taking of the last picture at position P⁴, the actuator lever 88 is once again locked by the detent 99. Those skilled in the art will appreciate that at this point it is desirable to obtain access to the exposed film, and I provide means whereby the act of taking the exposed film from the plate holder H effects the release of the shutter actuating mechanism and more particularly the actuator lever 88. Thus, the link 102 has pivoted thereto at 107 a further link 108 that is pivoted at 109 to an arm 110 integrally secured at 111 to a vertically moving link 112. This link 112 is suitably guided for vertical movement on the camera frame as by a pin 113 extending from the camera frame into a slot 114 thereof. A pair of bell cranks 115 are pivoted at 116 to the link 112, suitable bosses 117 being provided in one of the right angle structural members 61 for the pivotal mounting of the said bell crank levers 115. Arms 118 are formed on each of the bell crank levers 115 and extend laterally at 119 into position for contact by a surface 120 on the latch 51.

When the plate holder is in its upper position of Figs. 6 and 12, counter-clockwise rotation of latch 51 will depress the portion 119 of the arm 118 of the upper bell crank lever 115. When the plate holder is in a lower position the surface 120 of latch 51 will coact similarly with the lower of the bell crank levers 115. Obviously, the clockwise rotation of the latch 51 will effect a counter-clockwise rotation of one or the other of the bell crank levers 115 to impart upward movement to the link 112. This upward movement results in an upward movement of the arm 110 and a consequent pivotal movement of the link 102 about its pivotal shaft 103. This, of course, effects clockwise rotation of the detent 99 about its pivot 100 to withdraw the surface 99a from locking engagement with pin 98. Thereupon, the actuator lever 88 is released and restored to its operative position of Figs. 9 and 12. Of course, the particular movement of the latch 51 just described is effective to release pin 53 of the door 48 of the plate holder H so that the plate may be removed and a fresh plate substituted therefor. It is thus readily seen that a double exposure of the film is never possible since it is always necessary to move the camera or to open the plate holder H in order to restore the effectiveness of the shutter actuating mechanism.

Referring now more particularly to Figs. 5, 7 and 9, it will be noted that there extends from the main frame of the camera a box-like housing 121 in which is adapted to be inserted a plate 122. The plate 122 is in turn adapted to support through clips 123 a customer number and data card 124. This number and data card is filled out with the name of the particular customer whose photograph is to be taken, and a serial number. When the card 124 and plate 122 are inserted into the housing 121, the serial number on the card will be exposed through a slot 125 in the said housing. The slot 125 is in turn directly under a passage 126 in the camera that is normally closed by a shutter 127.

In alignment with the passage 126 there is a mirror 128 positioned to reflect light longitudinally of the camera toward the plate film in holder H. This light will be reflected to one of the four sections S¹, S², S³, and S⁴ of the plate through one of the partitioned openings 129, 130, 131 and 132 of the plate holder H depending upon the position of the plate holder H relatively to the lens L of the camera.

Shutter 127 is adapted for movement by a trigger 133 carried by a sliding plate 134. This plate 134 is best shown in Fig. 5 and Fig. 12, and is pivoted at its lower end through a pin 135 to the arm 95 of the actuator lever 88. The sliding plate 134 is guided through its slot 136 coacting with a pin 137 for movement in a predetermined path so that the trigger 133 will strike the lip 127a of the shutter 127 as the plate 134 moves upwardly from its position in Fig. 5. It will now be readily appreciated that when the actuator 88 is rotated clockwise on its pivot shaft 89 to actuate the shutter mechanism for taking a photograph, the sliding plate 134 through trigger 133 will simultaneously move the shutter 127 so that light may be reflected from the number and data card 124 against the film in the path of the line 138 best seen in Fig. 5. In this way, the taking of a photograph will be effective to record simultaneously on the film the number of the card of the particular customer whose photograph is being taken.

As was indicated broadly earlier in the specification, it is frequently necessary to tilt the base 12 so as to tilt also the camera 10 and mounting member 11. This tilting is accomplished by providing the foundation member 13 with a pair of arcuate tracks 140 with which coact rollers 141 supported on brackets 142 carried by the base 12. Obviously, any movement of the base 12 on the rollers 141 will be effective to tilt the base and the camera mounted thereon. For moving the base 12 on its rollers 141 relatively to the foundation member 13, I provide the foundation member 13 with a roller chain supporting track 143 that is arcuate in shape to the same degree as are the tracks 140. A bracket 144 and additional brackets 145 depending from the base 12 support for rotation a shaft 146, this shaft being rotatable by a pair of cranks 147 secured at each end thereof.

There is mounted on the shaft 146 a sprocket 148 that is adapted for engagement with the links of a roller chain 149 that is applied to the surface of the track 143. It is now obvious that a rotation of the shaft 146 by either of the cranks 147 will effect rotation of the sprocket 148 and a consequent movement of the base 12 relatively to the foundation 13. This will of course result in a tilting movement of the camera. It will be well to indicate that the arcuate path in which the camera moves is part of a circle centering on the lens of the camera indicated at L in Figs. 3 and 4. In view of this arrangement, the camera will be focused on the object in all positions thereof.

I believe that the operation and construction of my invention will now be quite apparent to those skilled in the art, but I think it best to review one complete operation thereof.

With the plate holder in the position of Figs.

5 and 11, and the camera in position P¹, a plate film is placed in the said plate holder H, and the latch 51 locked. Thereupon the camera is moved by manipulation of the focusing knob 32 until the camera is a desired distance away from the object depending on the type of picture to be taken. During the movement of the camera relatively to the racks 28 induced by rotation of the knob 32, the focusing of the camera will be maintained through the sprockets 31, 36 and the chain 37, these parts acting to rotate the eccentric pin 44 that is first adjusted to vary the focus of the camera in proper relation to its movement toward and from the object.

The plate 122 and a customer data and number card 124 are then placed in the housing 121, and the operator depresses the actuator lever 88. This depression of the actuator lever 88 effects the operation of the shutter mechanism to expose the film and simultaneously moves the shutter 127 to reflect the serial number of the customer's card 124 onto a part of the film plate that is subtended in opening 129. The actuator lever 88 is of course now locked in its depressed position by the detent 99 so that a second exposure can not be made. Now, the operator rotates the crank 19 after first releasing the detent 19a, the said indent 19a acting to lock the crank 19 once again when it has been rotated a predetermined degree. This predetermined rotation of the crank 19 will effect a movement of the camera from the first picture taking position P¹ to the second picture taking position P². The cam 105 and shaft 68 are rotated through this rotation of the crank 19 and its shaft 16 through the intermediary of the pinion 74 and gears 71 and 78, and cam 105 acts of course to move the detent 99 to release the actuating lever 88. Of course, the pinion 67 has coacted with the rack 65 to move the film plate holder H to expose a second one of the sections S¹, S², S³, and S⁴ to the lens L. A second exposure may now be made by actuator or lever 88. After the final film action has been exposed through full movement of the plate holder by both pinions 67, 69, the actuator 88 is released by operation of the latch 51 through the medium of the bell cranks 115 and the link 102. The plate film may now be removed and a new plate positioned in the plate holder H for a repetition of the cycle of operation in a reverse direction. The adjustment of the camera for tilting has of course been explained and need not be emphasized further here.

It is thought that those skilled in the art will now fully appreciate the considerable merits of my invention and the results contributed thereby.

I now claim:

1. In a camera of the class described, a plate holder, means mounting said plate holder for sliding movement in said camera, a series of rack portions fixed on said plate holder in predetermined angular relation, at least one of said rack portions having its teeth in offset relation to the other of said rack portions, an operating shaft, a pair of pinions axially spaced on said shaft for rotation on said camera so that one pinion will engage operatively only the said one of said rack portions and the other of said pinions engages operatively the other of said rack portions, the said rack portions being of such form and so angularly positioned and offset that when one rack portion is engaged operatively with one pinion, the other rack portion is disengaged operatively from the other pinion.

2. In a camera of the class described, a plate holder, means mounting said plate holder for sliding movement in said camera, a series of traction contributing members fixed on said plate holder, at least one of said traction contributing members being in offset relation to the other of said traction contributing members, a shaft, a pair of traction contributing means on said shaft adapted for rotation on said camera, said traction contributing means being offset axially of said shaft so that one traction containing means will engage only the said one of said traction contributing members and the other of said traction contributing means engages the other of said traction contributing members, the said traction contributing members being so positioned and offset that only one traction contributing member will at any one time be engaged with a traction contributing means for movement.

3. In a combination of the class described, a plate holder, means mounting said plate holder for sliding movement in a vertical plane on said camera, rack portions fixed to said plate holder and forming, in effect, a continuous rack having a pair of parallel rack portions connected by a transverse rack portion perpendicular to said parallel rack portions, said transverse rack portion lying offset relatively to said parallel portions, a pair of pinions coaxially mounted in offset relation so that one pinion will engage only the transverse rack portion while the other pinion engages said parallel rack portions, said transverse rack portion terminating at a point to engage or disengage said one pinion just as the other pinion disengages or engages the parallel rack portions, and said one pinion having a tooth relation to said transverse rack different from that of the other pinion to said parallel racks.

LUTHER G. SIMJIAN.

REFERENCES CITED

The following references are of record in the file of this patent:

UNITED STATES PATENTS

| Number | Name | Date |
|---|---|---|
| 30,850 | Wing | Dec. 4, 1860 |
| 492,025 | Klay | Feb. 21, 1893 |
| 872,871 | Wayland | Dec. 3, 1907 |
| 969,360 | Grandperrin | Sept. 6, 1910 |
| 1,312,675 | Boyer | Aug. 12, 1919 |
| 1,362,787 | Gongaware | Dec. 21, 1920 |
| 1,662,304 | Doogood et al. | Mar. 13, 1928 |
| 1,722,935 | Messter | July 30, 1929 |
| 1,749,012 | Willson | Mar. 4, 1930 |
| 1,925,524 | Riccio | Sept. 5, 1933 |
| 1,982,322 | Ries et al. | Nov. 27, 1933 |
| 2,140,602 | Simjian | Dec. 20, 1938 |
| 2,172,283 | Kirby et al. | Sept. 5, 1939 |
| 2,356,363 | Thompson | Aug. 22, 1944 |
| 2,364,363 | Howell | Dec. 5, 1944 |
| 2,386,276 | Simjian | Oct. 9, 1945 |
| 2,400,455 | Donaldson | May 14, 1946 |

FOREIGN PATENTS

| Number | Country | Date |
|---|---|---|
| 459,167 | Great Britain | Jan. 4, 1937 |